United States Patent

De Witt

[15] 3,660,606

[45] May 2, 1972

[54] METHOD AND APPARATUS FOR TIME DIVISION MULTIPLEX TRANSMISSION OF DATA AND VOICE SIGNALS

[72] Inventor: Russell G. De Witt, Berkeley Heights, N.J.

[73] Assignee: The Western Union Telegraph Company, New York, N.Y.

[22] Filed: Apr. 28, 1970

[21] Appl. No.: 32,616

[52] U.S. Cl. ....................................179/15 BA, 178/69.5 R

[51] Int. Cl. ..........................................................H04j 3/16

[58] Field of Search ................178/69.5 R; 179/15 BA, 15 A, 179/15 BM

[56] References Cited

UNITED STATES PATENTS

| | | | |
|---|---|---|---|
| 3,535,450 | 10/1970 | Vollmeyer | 178/69.5 R |
| 3,337,691 | 8/1967 | Litchman | 179/15 BM |

*Primary Examiner*—Ralph D. Blakeslee

*Attorney*—Michael I. Borsella

[57] ABSTRACT

Disclosed is a method for TDM transmission of binary data signals, such as telegraph signals, including the steps of: sampling the data signals at a rate to provide a plurality of samples such as 5 to 40 samples over the time interval associated with each digit of the binary data signals, serially coding the samples to provide a TDM signal representing the sampled data signals, and transmitting the serially coded TDM signal over a transmission medium. Also disclosed is a preferred apparatus for transmitting a variable number of data and voice signals which includes a crystal oscillator for providing a 1.544 megabit timing signal, a digit generator, a channel counter providing a channel count for every eight digits and providing 24 channel counts as the transmission format, interchangeably removable voice and data input circuits for occupying the channels of transmission with either voice or data inputs, wherein the data input circuits include sampling gates for transmitting a plurality of samples of the data signals so that the transmission digit rate is essentially independent of the digit rate of the input data signals. The voice input circuits include conditioning and wiring provisions to be interchangeable with the data input circuits. Also included are voice encoding means to provide a voice output PCM signal, and switching means for switching the output to transmit the serially coded TDM signal during the occurrence of data carrying channels, and for switching the output to transmit the PCM voice signal during the occurrence of voice carrying channels. The apparatus also includes wiring means to each channel station of the apparatus so that the channel station can interchangeably accept either voice or data input circuits to occupy its channel of transmission. A receiving apparatus is also disclosed employing features similar to the transmitting apparatus to provide for flexible two-way communication to handle a variable number of voice and data signals.

12 Claims, 10 Drawing Figures

United States Patent [15] 3,660,606
De Witt [45] May 2, 1972
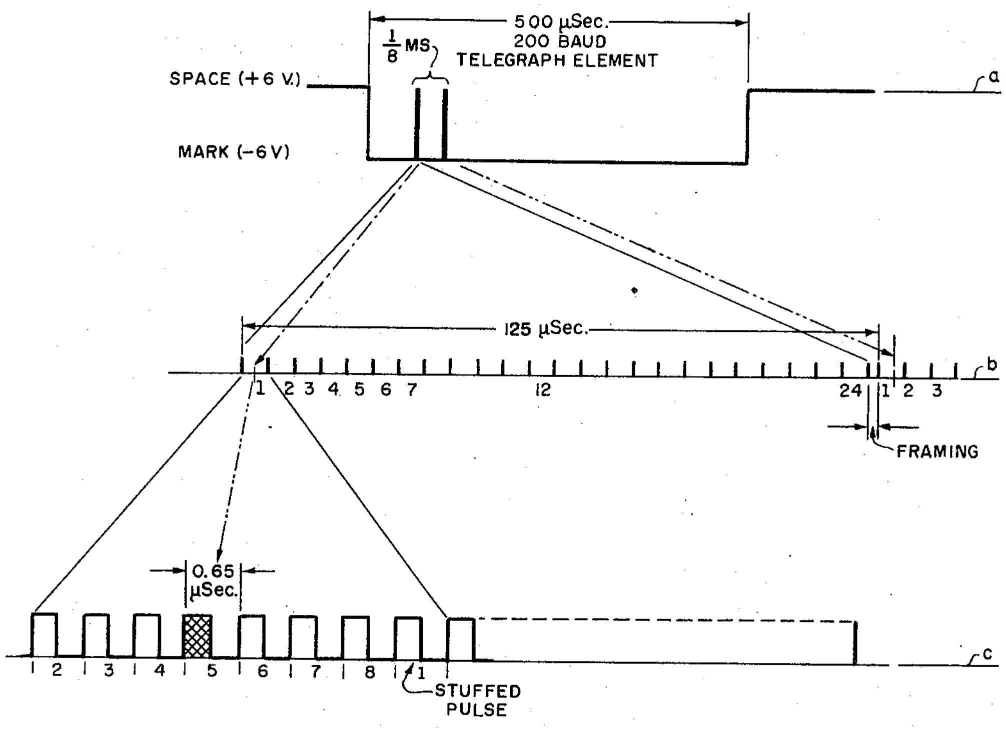

INVENTOR:
RUSSELL G. DeWITT
BY
Michael D. Bosella
ATTORNEY.

METHOD AND APPARATUS FOR TIME DIVISION MULTIPLEX TRANSMISSION OF DATA AND VOICE SIGNALS

BACKGROUND OF THE INVENTION

This invention relates to time division multiplex transmission and more particularly to time division multiplex transmission of both synchronous and asynchronous data signals and voice signals.

The pulse transmission system described in the January 1962 issue of the Bell System Technical Journal by C. G. Davis has come into widespread use for the time division multiplex transmission of 24 separate voice channels over a single circuit. The transmission format provides for sampling each of the voice signals once every 125 microseconds or 8,000 times a second. Each voice sample is encoded into a digital signal occupying seven time slots, with an additional time slot allocated for signalling information. Thus, the 24 voice samples require a total of 192 time slots for transmission. An additional, or 193rd time slot is added to permit framing or synchronization of the transmitter and receiver facilities. Thus, 193 time slots comprise a framing period, or transmission format, which includes all of the 24, eight time slot channels. The transmission format is repeated 8,000 times a second to provide for intelligible voice transmission. Thus, the transmission system must provide for 1.544 million pulses per second. This transmission format along with the repeatered line facilities used in its transmission has come to be known as the T—1 carrier.

In short distance TDM communication for best overall economy the emphasis is placed on low cost terminal equipment i.e., the receiving and transmitting apparatus. In long distance TDM communication the emphasis for best overall economy is placed on maximum efficiency in the use of line bits, as well as terminal costs. Accordingly it is highly desirable to provide a TDM terminal system having the flexibility of meeting the requirements of both short and long distance communication.

The flexible terminal system of this invention is useful for both short and long distance communication. The data channel unit hereinafter described is intended to provide very low terminal cost. This approach provides a cost per data channel which is significantly lower than any available in the prior art.

The invention as herein disclosed provides for a time division multiplex communication system which combines simplicity with the flexibility of handling varying amounts of both voice and data signals at various speeds. Thus, the system of the present invention is as highly attractive economically and technically for telegraph and data transmission as has been the T—1 carrier system economically and technically attractive for voice transmission.

SUMMARY

One aspect of the present invention resides in a method for transmitting data from a source thereof which provides the date in the form of a first signal comprised of binary data digits including the steps of; sampling the data signal at a rate sufficiently high to provide a plurality of samples over the time interval associated with each of the data digits, serially coding the samples to provide a time division multiplex second signal wherein a first state of the digits thereof corresponds to a first state of a corresponding data digit of the first signal, and a second state of which corresponds to a second state of a corresponding data digit of the first signal, and transmitting the time division multiplex second signal over a transmission medium. Thus, by transmitting a plurality of samples for each digit of the data signal, the digit rate of the pulse transmission system is rendered essentially independent of the digit rate of the data signals and variations of the data signal digit rate require no time delay provisions in the pulse transmission system.

Another aspect of the present invention resides in a method for transmitting a plurality of telegraph signals over a voice channel of a time division multiplex system wherein the voice channel includes a sufficient number of binary time slots to intelligibly transmit a voice signal and wherein each of the telegraph signals is a binary coded serial signal. This method includes the steps of: sampling each of the telegraph signals at a rate sufficiently high to provide a plurality of samples of each respective telegraph signal during the time interval occupied by each respective digit thereof, serially coding the samples to provide a time division multiplex signal in which no more than one of its time slots is allocated to the respective samples of each of the telegraph signals so that each of the time slots carries at least one telegraph signal, and transmitting the time division multiplex signal over a transmission medium.

Another aspect of the present invention resides in a time division multiplex apparatus for concurrently transmitting at least one voice signal and at least one binary data signal, including, timing and digit generating means for generating series a series time digit signals arranged in a repetitive time format suitable for time division multiplex transmission wherein the format includes a plurality of channels each having a sufficient number of binary time slots to intelligibly transmit a voice signal, means for periodically sampling the voice signal at a rate sufficiently high to enable intelligible reconstruction of the voice signal and for providing a pulse amplitude modulated first signal corresponding to the periodic voice samples, and encoding means responsive to the timing and digit generating means for encoding the pulse amplitude modulated first signal to provide a pulse code modulated second signal suitable for transmission over a first channel of the aforementioned format. The apparatus further includes means for periodically sampling and serially coding the aforementioned data signal by sampling the signal at a rate sufficiently high to provide a plurality of samples thereof for each digit of the data signal and for serially coding the samples thus obtained in response to the timing and digit generating means to occupy a predetermined repeated time slot of a second channel of the time format and for providing a serially coded data third signal corresponding thereto, output means, for transmitting the serially coded first signal and the pulse code modulated second signal over the transmission medium, and switching means responsive to the timing and digit generating means for switching the output means to transmit the serially coded data third signal during the occurrence of the second channel for transmission and for switching the output means to transmit the pulse code modulated second signal during the occurrence of the first channel of transmission.

In accordance with yet another aspect of the present invention the aforementioned apparatus is modified to provide the capability of transmitting a variable number of separate voice and binary data signals. In accordance with this version of the transmission system there is added to the aforementioned apparatus at least one removable voice channel input circuit for receiving into the apparatus at least one voice signal for transmission, wherein the voice channel input circuit is removably connected in the apparatus, and at least one removable data channel input circuit for receiving into the apparatus for transmission a plurality of the data signals, wherein the data input circuit is removably connected in the transmission apparatus. This embodiment of the invention further includes preselected channel connection means for interchangeably accepting the removable voice channel input circuit and the data channel input circuit to interchangeably occupy with the voice signal and the data signal at least one preselected channel of the channels for transmission, whereby the data transmitting capacity of the apparatus can be readily increased by removing the voice channel input circuit and replacing it by a data channel input circuit and the voice transmitting capacity of the apparatus can similarly be increased by removing the data channel input circuit and replacing it by a voice channel input circuit. Additionally, this combination of the apparatus adds the further flexibility wherein various interchangeable data channel input circuits can be provided to handle various speeds of incoming data for transmission without requiring changes of the transmission format.

In accordance with yet another aspect of the instant invention a time division multiplex receiving system is added to the last mentioned apparatus to provide the capability of two-way communication in the adjustable apparatus wherein voice signal gating and reconstituting means are added to said removable voice channel input circuit to reconstitute the received voice signals in the appropriate channels, and a plurality of output gates are incorporated in said removable data channel input circuits to recover the received data signals in the appropriate channels.

In view of the foregoing it is an object of the present invention to provide an improved method for the time division multiplex transmission of binary data signals.

It is another object of the invention to provide a method for time division multiplex transmission of a plurality of telegraph signals.

It is another object of the invention to provide a time division multiplex transmission apparatus for concurrently transmitting voice and data signals.

It is yet another object of the present invention to provide an adjustable time division multiplex transmission apparatus for transmitting a variable number of separate voice and data signals.

It is another object of the invention to provide an adjustable time division multiplex transmission apparatus having the capability of accepting various interchangeable data channel input circuits.

It is yet another object of the present invention to provide an adjustable time division multiplex communication apparatus for transmitting and receiving a variable number of separate voice and binary data signals.

These and other objects, advantages and features of the invention will be more fully understood by referring to the following descriptions and claims taken in conjunction with the accompanying drawings.

DESCRIPTION OF THE PREFERRED EMBODIMENTS

Figure 1:
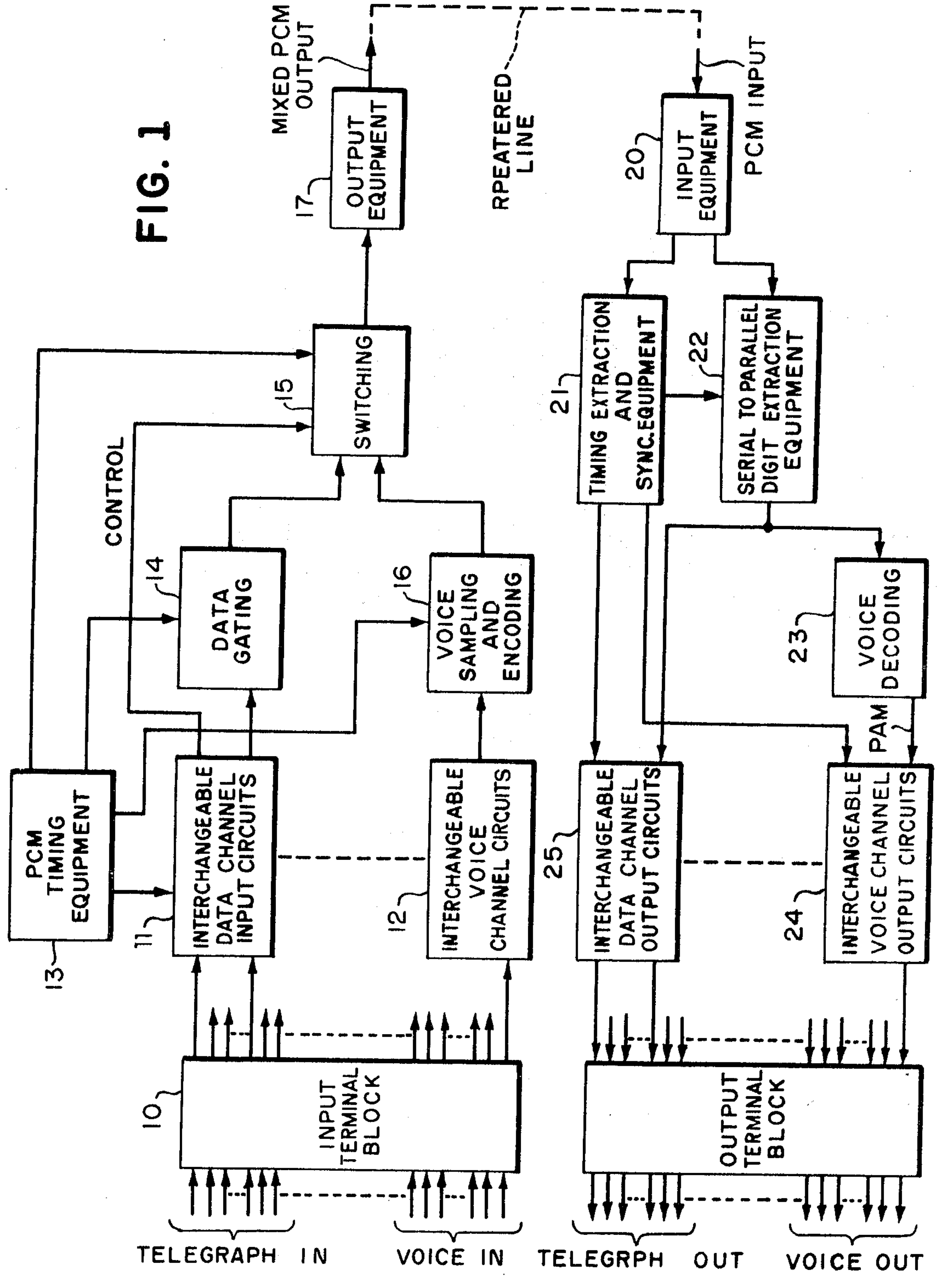
FIG. 1 is a block diagram schematic illustrating a transmitting and receiving apparatus in accordance herewith.

Referring to FIG. 1 which illustrates in block diagram form a time division multiplex transmission system in accordance herewith, an input terminal block 10 is provided which receives a plurality of telegraph and voice signals for transmission. Telegraph signals are referred to here as a good example of binary data. As used herein the term binary data means data expressible in binary digits. That is, in digits capable of having two states. One state can be the presence or the absence of a positive pulse while the other state can similarly be the opposite condition or the presence or the absence of a positive or negative pulse, or ground. Also, as used herein the terms TDM and PCM are abbreviations for the terms, time division multiplexed and pulse code modulated, which are generally used interchangeably.

The telegraph data are comprised of a plurality of individual telegraph signals wherein each signal is a binary digital signal arranged in accordance with one of the known telegraph codes such as the ASCII code or the BAUDOT five level code. The presence or absence of the successive five digits, or levels, is used to identify a letter of the alphabet being transmitted. Thus, the entire alphabet as well as heading information, start of message, and end of message can be transmitted by a single binary digital signal. A first state of this signal is known as the space condition in which a positive 6 volts appears on the line for the digit time interval. The second state is known as the mark state in which a negative 6 volts appears on the line for the digit time interval.

The telegraph signals are carried from the input terminal block 10 to a group of interchangeable data channel input circuits one of which is shown designated 11. Seven telegraph signals are carried to each interchangeable data channel circuit to be loaded one signal for each time slot of the T—1 carrier as will be discussed below.

A number of separate voice signals are introduced into the apparatus through input terminal block 10 and are carried to a number of interchangeable voice channel circuits one of which is shown designated 12. One voice signal is carried to each voice channel circuit to be singularly allocated to a channel of the T—1 carrier.

Time division multiplex timing equipment 13 is provided which includes a conventional crystal oscillator for providing the basic time frame, a channel counter for signalling the occurrence of each channel of the transmission format, and a digit generator for signalling the occurrence of each of the successive digits comprising the successive channels. When a channel for carrying data occurs the channel counter provides a channel pulse which signals the data channel circuits to release, as a parallel group, the seven telegraph signals present in that channel circuit. This parallel group of signals is carried to a data gating circuit 14 which includes various gates responsive to the digit generator of the timing equipment and loads each of its input data or telegraph signals singularly on a predetermined time slot of the transmission channel. Thus, the data gating circuit 14 in conjunction with the data channel circuits 11 are providing a sampling and serially coding function by viewing each of the input data signals for a narrow increment of time corresponding to a time slot of the transmission format, i.e., as designated by the digit count from the timing equipment 13. This data gating occurs in a repetitious manner such that each successive channel of data is gated to follow the preceding channel and each channel time slot is viewed or transmitted, once for the occurrence of the entire time frame of transmission. Thus, a telegraph signal occupying time slot number one of channel one would be viewed and transmitted only on each concurrent occurrence of channel one and time slot one. Whereas digit or time slot one is repeated once for each channel where it can carry other data or telegraph signals. Thus, the data gating circuit 14 needs include only eight parallel data gates. The data signals thus serially coded are carried from the data gating circuit 14 to a switching circuit 15. As will be apparent from the description below in reference to FIG. 3A the data gating circuit 14 can be joined with the data channel circuit 11 to form a single removable channel unit.

The voice signals from each of the interchangeable voice channel circuits 12 are carried to a voice sampling and encoding circuit 16 which is essentially as described in the aforementioned article appearing in the Bell System Technical Journal. Each of the voice signals is sampled at a sampling rate high enough so that the mid-range voice frequencies are not lost in order that the voice signals can be intelligibly reconstructed at the receiving terminal. In the T—1 carrier system each voice signal is sampled 8,000 times a second. This sampling is performed in response to the channel counter of the timing equipment 13 and occurs once in respect of each voice signal for each recurrence of its transmission channel. The successive voice samples are encoded one per channel to form a serial pulse code modulated signal suitable for transmission. This signal is in turn carried to the switching circuit 15.

Each channel connection of the apparatus includes a dual set of wiring to handle both data and voice. Thus, the data channel circuit 11 and the voice channel circuit 12 can be interchangeably used. Accordingly, if a data channel input circuit is present in the apparatus in respect of a particular channel the input data is serially coded and carried to the switching circuit 15 on the occurrence of that particular channel. If the data input circuit is replaced by a voice channel input circuit then on the occurrence of that particular channel the voice signal, in pulse code modulated form, is carried to the switching circuit 15. A gate is provided in the data channel input circuit 11 so that on the occurrence of its channel a control pulse is carried to the switching circuit 15 so that this circuit may recognize that a data channel input circuit is present for that particular channel of transmission. With respect to each channel of the transmission format the switching circuit 15 is adapted to switch to its output the data signal from the data gating circuit 14 on the occurrence of all channels for which data channel input circuits are present in the apparatus, and further, to switch to its output the signal from the encoding circuit 16 on the occurrence of all channels for which a voice channel input circuit is present in the apparatus. The output of the switching circuit 15 is carried to output equipment circuit 17, which includes such circuits as a bipolar converter to provide the TDM output in bipolar form and any amplification required for transmission. The output is transmitted over a suitable medium such as the repeatered line facilities generally associated with the T—1 carrier. Also, the output can be wirelessly transmitted by known techniques.

At the receiving terminal the transmitted signal first enters through input equipment 20 which may include such equipment as an amplifier and a rectifier to make unipolar the received signal. This received signal is in turn carried to timing extraction and synchronization equipment 21 which extracts the timing inherent in the received signal and includes a channel counter and digit generator. The timing extraction and synchronization equipment also includes a framing circuit for keeping synchronized the receiver channel counter with the transmitter channel counter. The received signal is then carried to a serial to parallel digit extraction circuit 22 which includes a shift register and a set of parallel output gates to restore, in parallel form, the eight digit signals making up each channel transmitted. On the occurrence of each successive channel the digit signals are in turn carried to a voice decoding circuit 23 which decodes the pulse code modulated digits of each channel to provide a pulse amplitude modulated signal in serial form representing the received channels. The pulse amplitude modulated signal is in turn carried to a number of interchangeable voice channel output circuits 24. Each of these circuits includes an input gate which is responsive to the channel counter of the timing equipment 21, so that it may pass the pulses representing the appropriate voice signal on the occurrence of the corresponding voice channel received. Also, each of the interchangeable voice output circuits includes an integrating circuit so that the successive pulses are integrated to reconstruct the original voice signal. The voice signals thus reconstructed are available as a set of parallel outputs from the voice channel output circuit 24.

The eight digit signals from the digit extraction circuit 22 are also carried to a group of interchangeable data channel output circuits 25. Each of these circuits includes a set of gates responsive to the channel counter of the timing extraction equipment 21 so that on the occurrence of the appropriate data channel the digits representing the sampled data signals are processed by the data channel output circuits as a parallel group. This processing includes an output switching function which holds the received state of the time slot digits through the entire occurrence of the specific data channel until the state changes when the channel recurs. The data signals thus reconstructed are available in the form of parallel output signals from the interchangeable data channel output circuits 25.

It is preferred that the transmission and receiving facilities illustrated briefly in FIG. 1 be incorporated in a single piece of terminal equipment which can therefore be capable of two-way communication. In this way the interchangeable input and output data circuits can be grouped together in the form of a removable sub-assembly. A similar removable sub-assembly is proposed grouping the input and output voice channel circuits. Each of these respective sub-assemblies can be constructed to occupy one or more channels of the transmission format. Thus, where maximum flexibility is preferred these sub-assembled circuits can be arranged to occupy only one channel of the transmission format. On the other hand where such flexibility is not essential the sub-assemblies can be configured to handle several channels in each sub-assembly. Thus, by removing a single sub-assembly of one type and replacing it by the sub-assembly of the other type both the transmission and receiving sides of the terminal are simultaneously adjusted. This adjustment will necessitate a similar adjustment to a corresponding transmit and receive terminal in communication with the first terminal.

Figure 2:
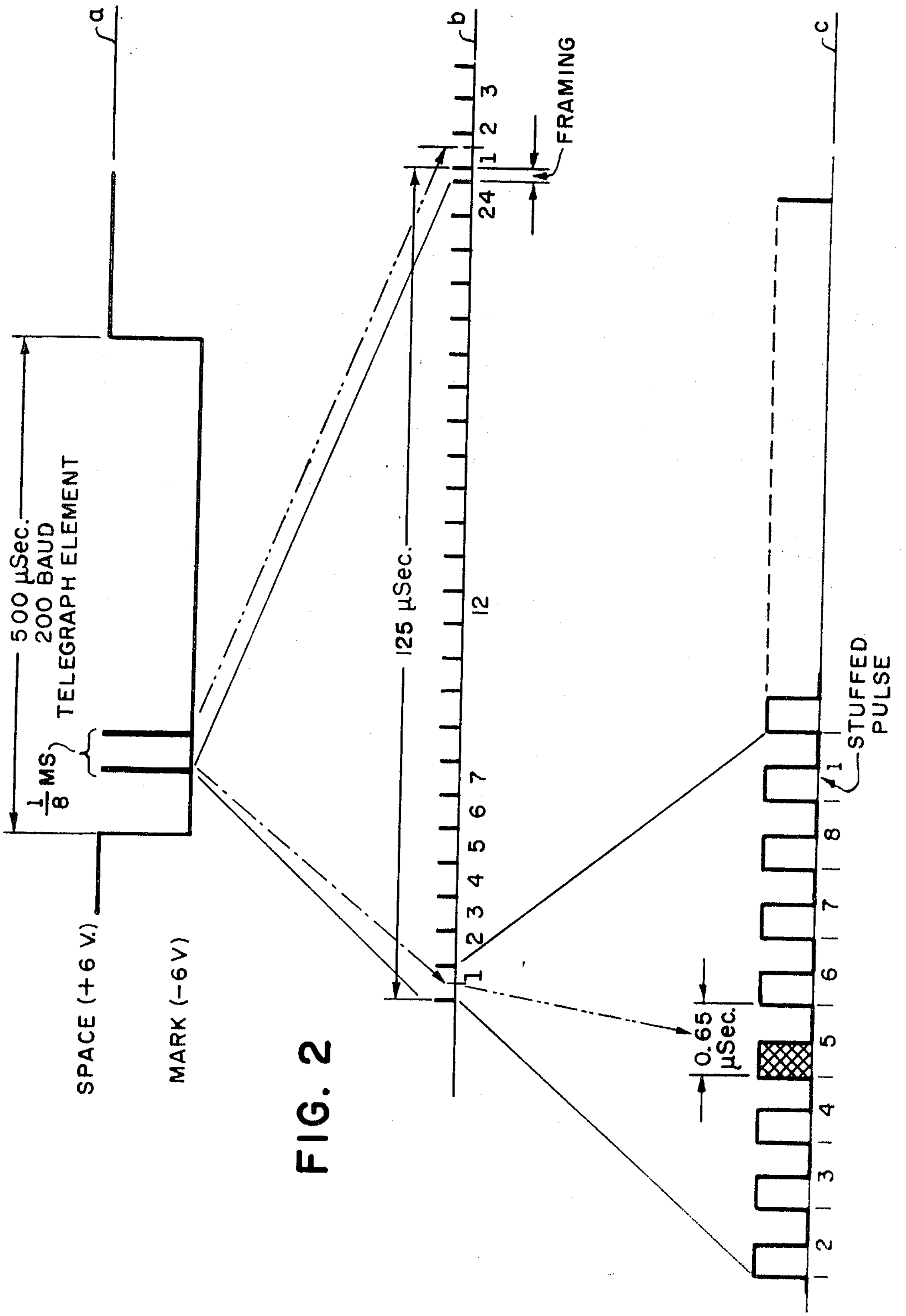
FIG. 2 is a time diagram illustrating on line *a* a typical 200 BAUD telegraph element and illustrating on lines *b* and *c* the use of a transmission format for transmitting the element of line *a* in accordance with the invention.

Referring now to FIG. 2 which illustrates the use of a time division multiplex transmission format for transmitting binary data in accordance with the present invention, the basic transmission format is illustrated on line *b*, which in the instance of the T—1 carrier, is comprised of 24 channels. A framing bit is transmitted between the occurrence of the 24th and first channels. The framing bit is shown having an exaggerated time width for the purpose of clarity. In FIG. 2 time is assumed to move from left to right thus channel 1 is transmitted before channel 2 and so on. On line *b* the entire framing period of 24 channels is shown to occupy 125 micro-seconds of transmission time and then the frame is transmitted again. Line *c* illustrates the eight digits which make up each channel of the format. They are shown in the presence state to illustrate that each digit is returned to zero before the next digit is transmitted. Each digit including the rest time between pulses occupies 0.65 micro-seconds.

Line *a* illustrates a typical telegraph transmission digit which is also known as a telegraph element. Its nominal transmission rate in this example is 200 BAUD or bits per second. The digits of such telegraph signals are usually non-return to zero occupying their entire time interval in a given state. In the space condition, which is construed in telegraphy as a no-pulse, it appears as a positive 6 volts, and in the mark condition, which is construed as a pulse state, it appears as a negative 6 volts. The particular state of each digit persists for the entire 5,000 micro-second time interval shown. The example of a telegraph signal is chosen to illustrate the flexibility of the system to handle signals of various forms.

The telegraph signal is shown loaded for transmission on the fifth time slot of the first channel and is sampled and transmitted each time this time slot and channel recur. Thus, the time interval between samples is the time interval occupied by the entire transmission frame, or, 125 micro-seconds. This provides for 40 samples per digit of this 200 BAUD telegraph signal. If for some reason a greater number of samples per digit are required it could be loaded to yet another time slot of an appropriately chosen channel, such as channel 13. This would in effect double the sampling rate.

It is generally preferred that the sampling rate be sufficiently high to provide for a plurality of samples of each data digit. In this way a variety of date rates and binary data forms can be transmitted without undue complexity of the apparatus. The sampling referred to is distinguished from the normal sampling of voice signals which is amplitude sampling. Data sampling merely has to ascertain the state of the binary data digit. This is easily done by applying the input data signal to an input gate for opening the gate when it is in one of its particular states and the transmitted signal can be appropriately interpreted by the receiving apparatus.

In the transmission of telegraph data it is extremely important that each data digit be properly recognized and transmitted with almost complete freedom from errors. Two sources of errors are digit errors on the repeatered line and distortion of the telegraph signal which results in errors. The former is strictly a function of the design of the repeatered line while the latter is a function of the design of the data channel unit.

I have found that sampling in the range of about five to 40 samples per digit provides an acceptable distortion level. Thus, if only one time slot of the transmission format is allocated to each telegraph signal, signals 0 to 1,600 BAUD digit rate can be safely accommodated with acceptable distortion. The system of the present invention is capable of meeting a distortion specification of less than plus and minus 2.5 percent when 40 samples per digit are taken of a 200 BAUD data signal.

Figure 3A:
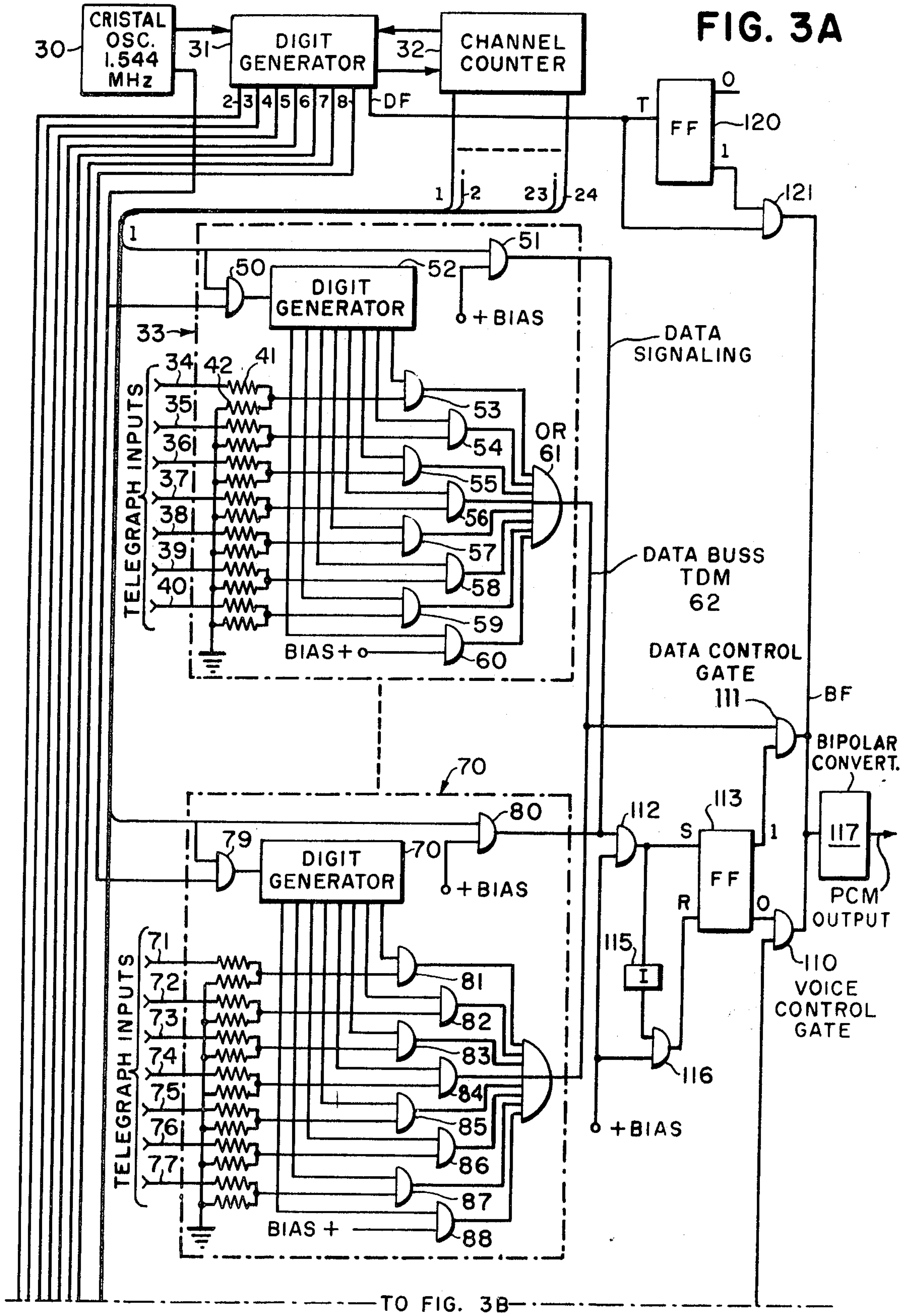
FIG. 3*a* is a block diagram schematic illustrating in greater detail the data transmitting portion of the apparatus of FIG. 1.

Referring now to FIG. 3*a* which shows in greater detail a portion of the apparatus of FIG. 1, a crystal oscillator 30 is shown, which provides a 1.544 MHz pulse train as the basic timing signal of the apparatus. This pulse train is carried to a digit generator 31 which provides eight separate digit signals, occurring sequentially, at a rate of 1.544 MHz, having pulse forms suitable for transmission as the time slots of the format. This group of parallel digit signals is carried to the encoder of FIG. 3*b* for use in voice signal encoding. The digit signals are also carried in serial form to a channel counter 32 which provides a channel count signalling the occurrence of each channel which is equal in duration to the occurrence of eight digits of the digit generator. The channel counter 32 provides its output in the form of 24 separate pulse signals in which the pulse width is equal to the time duration of each of the eight bit channels of the format. The channel counter also provides a control pulse which is carried to the digit generator instructing it to issue a ninth digit at the end of the 24th channel. This digit is used for framing.

The 24 channel signals from the channel counter are carried, one each, to the 24 channel stations in the apparatus. The first channel station is shown occupied by a removable data channel input circuit 33, which is shown receiving seven separate serially coded binary telegraph signals 34 – 40 for transmission. Each of the seven signals is introduced through a resistive load which in conjunction with the input impedance of the data processing circuitry results in a load corresponding to the standard telegraph interface. This interface is a 600 ohm resistive load which in connection with the plus and minus 6 volt signal, results in a nominal input current of plus and minus 10 ma. The input resistors shown, such as, 41 and 42, are selected to provide this interface.

The channel one signal from the channel counter 32, enters the data circuit 33, and is carried to an AND gate 50 and another AND gate 51. The AND gate 50 also receives the timing pulse train signal from the crystal oscillator 30 and passes it in the form of eight pulses during the occurrence of channel one. These eight pulses are passed to a digit generator 52 which functions as the digit generator 31 and releases eight parallel digits. However, the digit generator 52 remains dormant except during the occurrence of channel one. The eight parallel digits in form suitable for TDM transmission are separately carried to a set of AND gates 53 through 60. To the AND gates 53 – 59 are carried the respective telegraph signals 34 – 40 for enabling these gates. As the time slot digits occur they are passed in sequence by the gates 53 – 59 as either a pulse or a no-pulse depending upon the instantaneous state of each of the respective telegraph signals. The gate 60, which occupies the first time slot of this channel, is biased open so that it will always pass a digit on the occurrence of its time slot.

The sequential digits from the gates 53 – 60 are carried to an OR gate 61 through which they are placed on a common data buss 62. Thus, during the occurrence of channel one, eight digits in serial form, appear on the data buss 62, seven of which correspond to the states of the respective telegraph signals. The first digit is always transmitted in the presence state to insure that the repeaters of the transmission line facilities receive regularly spaced presence pulses to keep their clocks operative. This digit can be used to transmit data if the data carried by the entire channel is in a form to statistically provide a sufficient number of presence pulses to insure proper operation of the transmission line repeaters. The gate 51 provides a pulse, during the entire occurrence of channel one, to signal that this channel is carrying data for transmission.

A second removable data channel input circuit 70 is shown occupying channel 24. This data channel circuit is identical to the data channel circuit 33. Thus, it receives seven telegraph signals 71 – 77 for transmission. It also includes a digit generator 78, driven by a gate 79, which in turn, receives a channel 24 enable signal from the channel counter 32 and the pulse train signal from the crystal oscillator 30. A biased signalling gate 80 provides a pulse for the full duration of channel 24 to signal that this channel is carrying data information. The removable data channel circuit 70 includes AND gates 81 – 88 and an OR gate 89, which are identical to these gates as described above in reference to the data channel circuit 33. Thus, during the occurrence of channel 24, eight digits are serially placed on the data buss 62 seven of which represent the telegraph signals 71 – 77.

Figure 3B:
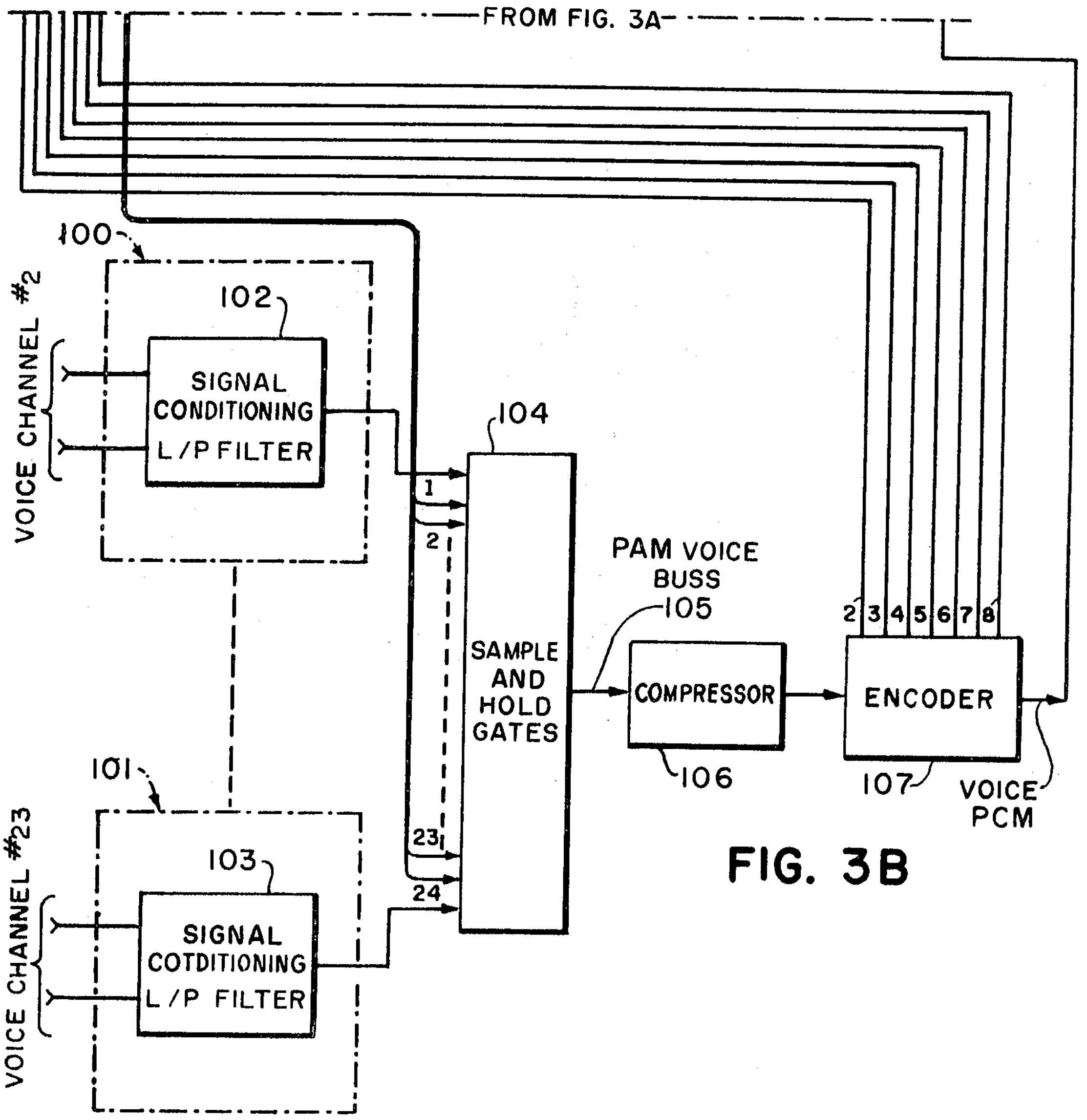
FIG. 3*b* is a block diagram schematic illustrating in greater detail the voice transmitting portion of the apparatus of FIG. 1.
Figure 3C:
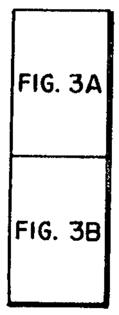
FIGS. 3*c* and 3*d* illustrate the placement of the sheets of FIGS. 3 and 4 to enable joining of these sheets to represent complete transmitting apparatus in accordance with the invention.
Figure 3D:
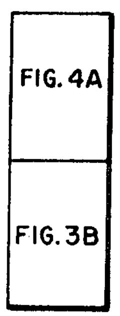

Referring now to FIG. 3*b* which illustrates in block diagram form the voice transmitting provisions of the apparatus, a pair of removable voice input circuits 100, 101, are provided, respectively occupying channel stations 2 and 23 of the apparatus. Each of these circuits receives a voice signal for transmission. Also, these circuits incorporate input signal conditioners including low pass filters 102, 103 respectively, for conditioning the voice signals prior to sampling and to remove voice frequencies above 8,000 Hz. The signal conditioned voice signals are singularly carried from their respective removable input circuits to a set of sample and hold gates 104 where the voice sampling is performed. Each voice signal is sampled 8,000 times a second on the occurrence to its respective channel for transmission. The gates 104 are essentially as described in the aforementioned article appearing in the Bell System Technical Journal and sample each voice channel in response to the signals from the channel counter 32 of FIG. 3 *a*. The sampling is amplitude sampling. The output from the sample and hold gates is a serially arranged pulse amplitude modulated (PAM) signal applied to a PAM voice buss. This PAM signal is, in turn, applied to a compressor 106 which compresses high amplitudes thereby favoring the lower amplitudes, and provides an output PAM signal thus conditioned which is, in turn, carried to an encoder 107. The encoder 107 receives the seven parallel digits from the digit generator 31, of FIG. 3*a*, and encodes each of the voice pulses to provide a seven bit digital word occupying a channel of the transmission format. Thus, the output of the encoder is in the form of seven serial digits, pulse code modulated, to represent a voice signal during the occurrence of that particular voice channel for transmission. The encoder output PCM signal is in turn carried to a voice output control AND gate 110.

The serially coded date on the data buss 62 is carried to a data output control AND gate 111. Gates 110 and 111 are part of a switching circuit for switching the output to transmit data signals during the occurrence of those channels for which data input circuits are present in the apparatus and for switching the output to transmit the voice PCM signal during the occurrence of those channels for which voice input circuits are present in the apparatus.

The output of the AND gates 51, 80 are carried to an AND gate 112. Thus, during the entire occurrence of a data carrying channel the input to gate 112 is high, indicating that the channel occurring at that time is a data carrying channel. The second input of the gate 112 is biased high. The output of the gate 112 is connected with the set terminal of a conventional bistable circuit 113, and sets this circuit to produce a reference voltage at its No. 1 output terminal during the occurrence of a data carrying channel. The No. 1 output terminal of the bistable circuit is connected with the AND gate 111 as its second input. Thus, during the occurrence of a data carrying channel, the gate 111 is enabled to pass the serially coded data on the data buss 62. The output of the gate 112 is also carried to an inverter 115, which provides a pulse when there is an absence of a pulse on the output of the gate 112. This inverted signal is carried to an AND gate 116, a second input of which is biased high so that the gate 116 provides an output pulse during the occurrence of channels not carrying data. The output of the gate 116 is carried to the reset terminal of the bistable circuit 113 to reset its output to provide a reference voltage at its 0 terminal and to provide no voltage at its No. 1 terminal. The 0 terminal of the bistable circuit is carried to the voice output control AND gate 110, to enable this gate to pass the PCM voice signal from the encoder. The outputs of the gates 110 and 111 are carried to a bipolar converter 117 which converts the unipolar TDM signals from these gates, carrying voice and data information, into bipolar form for transmission.

To provide the framing bit a toggling type bistable circuit 120, is provided, which has a single input. This input is connected with the digit generator 31 for receiving the aforementioned ninth digit occurring at the end of each frame. The output terminal of the bistable circuit 120 is connected to the input of an AND gate 121, the second input of which is taken from the input of the bistable circuit 120. The operation of this circuit is such that it changes the state of its output to the opposite state each time it receives an input pulse. Thus, its output is in the high state during a given frame, is in a low state during the next frame, and so on. Thus, the framing digit is alternately in the presence and absence state at the end of successive frames. The output of the gate 121 is in turn connected with the input of the bipolar converter 117 for transmission of the framing digit along with the voice and data signals.

FIGS. 3*a* and 3*b* illustrate the apparatus of the invention with two of the 24 channel circuits in place. Channels 1 and 24 are shown occupied by data input circuits and channels 2 and 23 are shown occupied by voice input circuits. For interchangeably accepting these circuits the apparatus is divided into 24 channel input stations. Each station includes connections and wiring provisions for interchangeably accepting either a data input circuit or a voice input circuit. Thus, for example, each station includes wiring coupled to the crystal oscillator 30, the digit generator 31, the channel counter 32, the sample and hold gates 104, and other equipment illustrated in FIGS. 3*a* and 3*b* such that the channel station can accept either a data input circuit or a voice input circuit. It is preferred that each of the two types input circuits be arranged on mechanically interchangeable printed circuit cards and that each channel station of the apparatus includes a single connector, which incorporates the aforementioned wiring provisions. Thus, the mere insertion of one or the other of the circuit cards into a particular channel station of the apparatus will invoke the appropriate circuits in the apparatus for transmitting tye type of information carried by the inserted card over that particular channel.

Figure 4A:
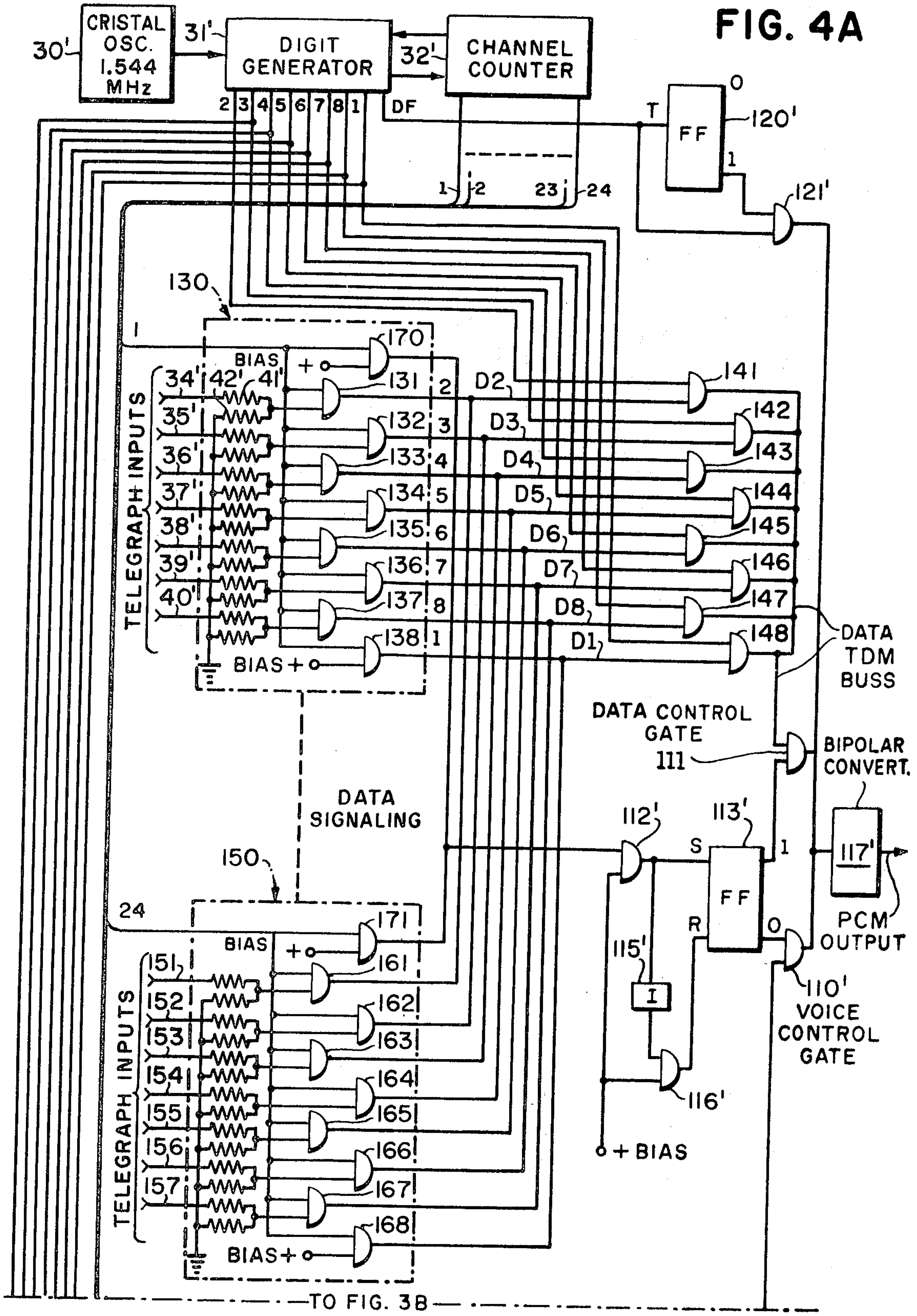
FIG. 4*a* is an alternate embodiment of the data transmitting provisions of FIG. 3*a*.

Referring to now FIG. 4*a* which illustrates an alternate embodiment of the data transmitting portion of the apparatus shown in FIG. 3*a* those equipment items the same as those described in reference FIG. 3*a* are identified by the same numeral but with a prime notation. Thus, a crystal oscillator 30′ is shown which drives a digit generator 31′ which provides the eight parallel digits for the time slots of the transmission format. A channel counter 32′ is shown for providing the 24 channel counts in response to the digit generator. To provide the framing digit a toggling type bistable circuit 120′ is shown, connected to an AND gate 121′, the output of which is as discussed above to provide the framing digit at the end of alternate frames.

A switching circuit is provided essentially as discussed above for switching the output to transmit the PCM signal during the occurrence of voice carrying channels. This switching circuit includes a voice control AND gate 110′, a data control AND gate 111′, a bistable circuit 113′, a pair of AND gates 112′, 116′ connected with the bistable circuit, and an inverter 115′.

Seven telegraph signals 34′ – 40′ are introduced into a removable data channel input circuit 130 where each signal passes through load resisters such as 41′ and 42′. Eight data AND gates 131 – 138 are provided in the removable data channel input circuit 130. Gate 138 is always biased in the presence state while gates 131 – 137 are connected to receive the respective telegraph input signals. These gates, receiving the input signals, are wired to receive and be enabled by the channel count, from the channel counter 32′. Thus, when channel one occurs the channel counter 32′ provides a channel one signal pulse for the entire duration of channel one and for this time interval the data gates 131 through 138 are all concurrently enabled. Thus, for the entire time interval of channel one the eight data signals concurrently appear in parallel form at the output of the data gates. The output of these gates is carried from the removable data input circuit 130 to a set of eight digit busses D1 thru D8. The eight digit busses are respectively connected to first input terminals of a set of eight AND gates 141 thru 148. The second input terminals of these gates are respectively connected to the digit terminals 1 through 8 of the digit generator 31. Thus, during the occurrence of channel one the respective states of digit busses D1 – D8 representing the telegraph signals 34′ – 40′ and the biased gate 138 are serially coded by the gates 141 – 148 to occupy the eight successive time slots of this channel. The eight digit busses D1 – D8 are wired to receive eight data signals from each of the channel stations of the apparatus.

A second data channel input circuit 150 is shown occupying channel 24 and is identical to the data channel circuit 130. Thus, telegraph signals 151 through 157 for transmission over channel 24 are introduced into the data channel input circuit 150 and pass through gates 161 through 167 during the occurrence of channel 24. A biased gate 168 is provided to occupy the first time slot of this channel. The outputs of the gates 161 – 169 are wired to the digit busses D1 – D8 and during the occurrence of channel 24 the data signals provided by the input circuit 150 are serially coded by the gates 141 – 148. The serially arranged output of these gates is carried by a single circuit to the data control AND gate 111′. Biased AND gates 170 and 171 are provided in each of the data channel input circuits to signal that these channels are carrying data information. The output of these gates is carried to the gate 112′.

A voice PCM signal is introduced into the gate 110′ from the voice PCM circuit illustrated in FIG. 3*b*. The gates 110′ and 111′ operate as discussed above in reference to FIGS. 3*a* and 3*b* to switch the output of the system to carry the voice and data signals.

Figure 5A:
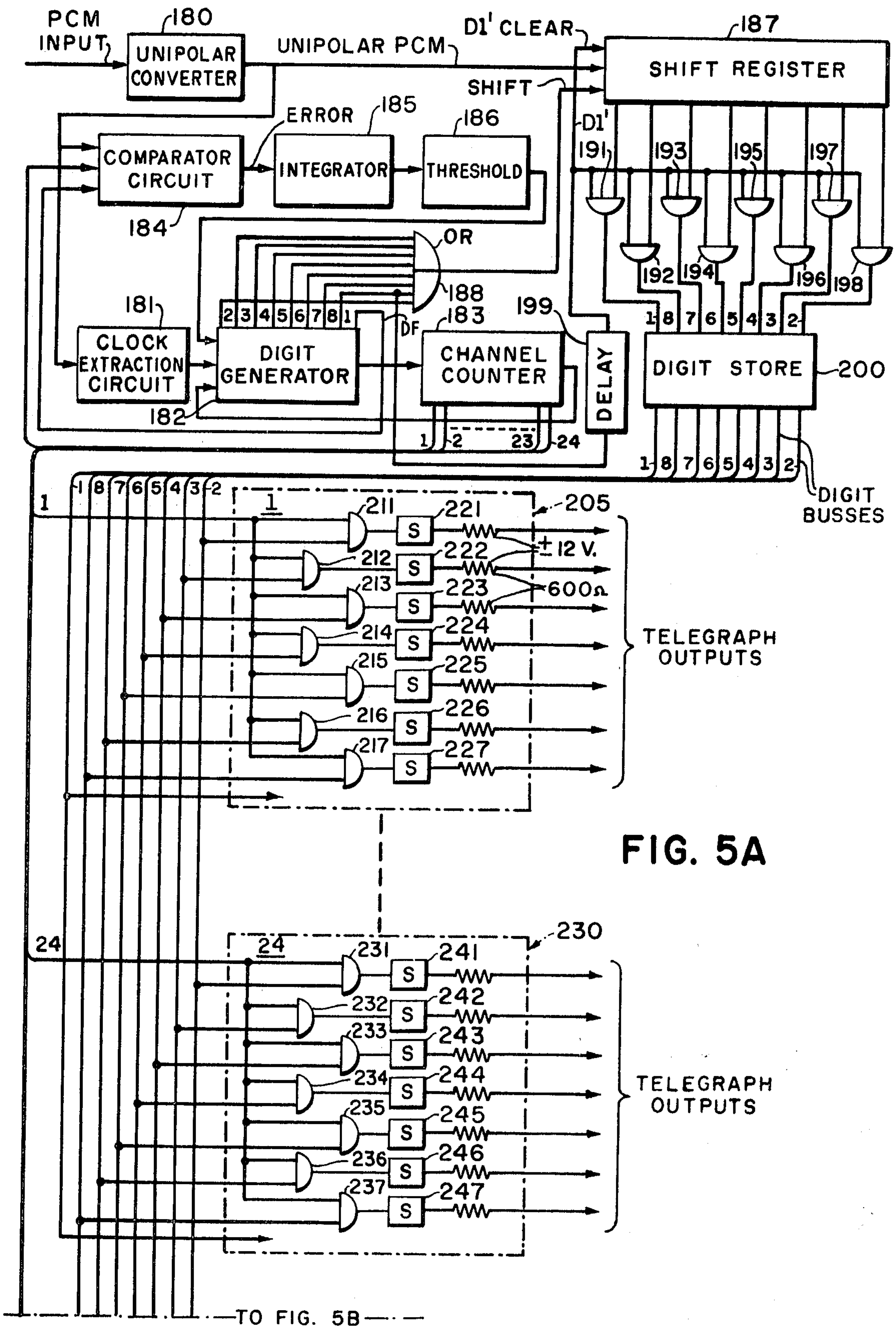
FIGS. 5*a* and 5*b*, when joined in accordance with FIG. 5*c*, is a block diagram schematic illustrating in greater detail the receiving apparatus of FIG. 1.
Figure 5B:
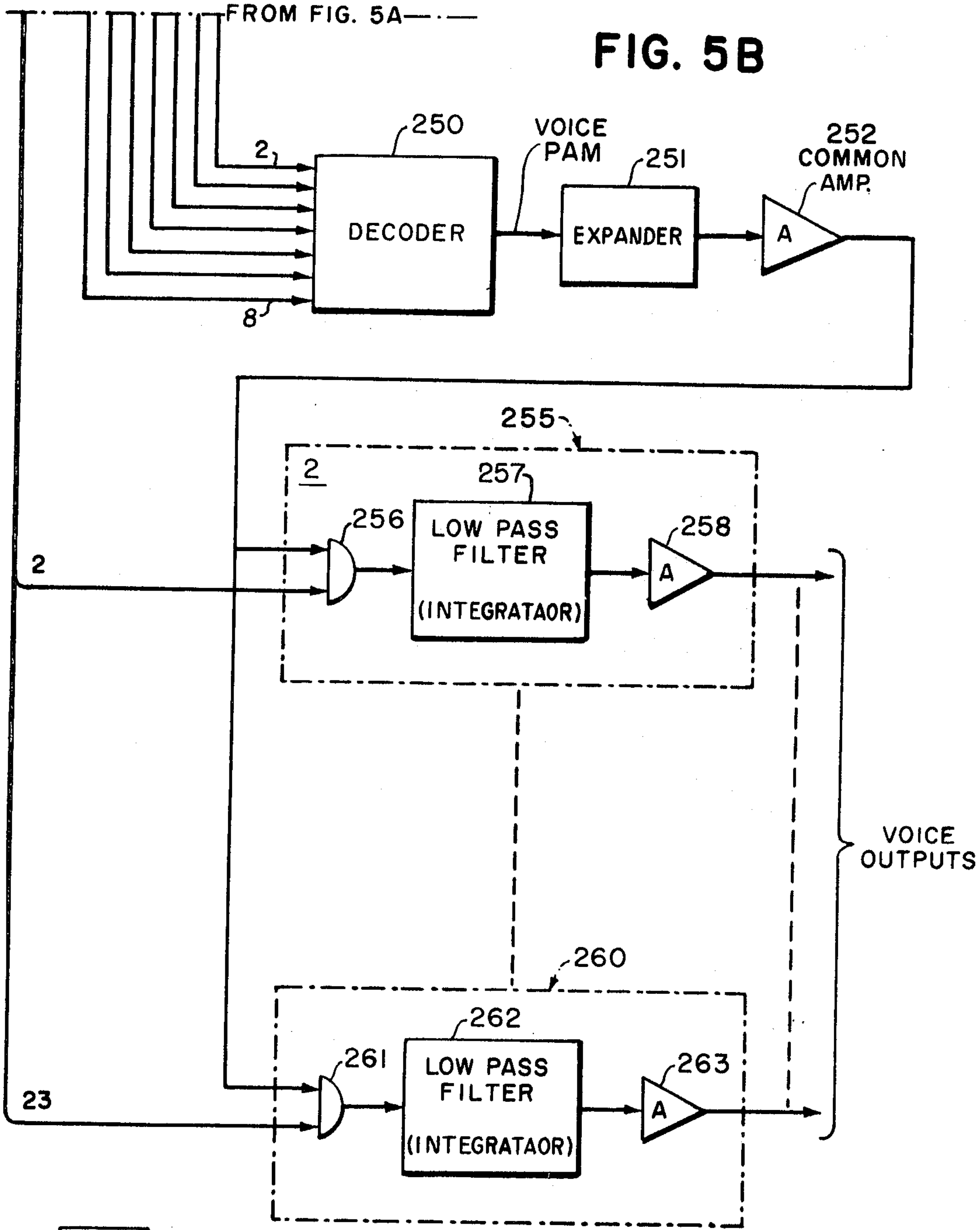
Figure 5C:
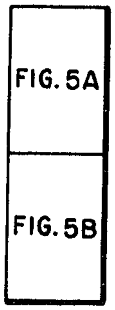

Referring now to FIG. 5*a* which illustrates a portion of the apparatus for receiving and demultiplexing the transmitted PCM signal, the received signal is introduced into the apparatus through a unipolar converter 180, which is essentially a rectifier and which converts the signal into unipolar PCM form. The unipolar PCM signal is carried to a clock extraction circuit 181 which extracts the 1.544 megabit timing inherent in the received signal. The clock extraction circuit drives a digit generator 182 which is in turn coupled to a channel counter 183. The digit generator and channel counter are essentially as their counterparts in the transmitting apparatus. Thus, eight continuously repeating digits are provided by the digit generator while the channel counter provides a channel count for each of the eight digits. These normal functions occur without regard for the framing condition of the receiving apparatus with the transmitting apparatus.

For framing, the digit generator is instructed by the channel counter to issue a ninth digit upon the completion of 24 complete counts of eight digits each. The ninth digit is carried to a comparator circuit 184 where the ninth digit signal operates an output gate to provide framing error signal pulses. These pulses are provided in the following way. An arbitrary channel pulse is carried from the channel counter 183 to the comparator 184 where it operates a toggle type bistable circuit which holds a first state to provide a pulse for a complete first frame of 24 channels and then when the same arbitrary channel pulse recurs, the bistable circuit toggles over to hold its second state for the next full frame. The unipolar PCM signal from the converter 180 and the ninth digit from the digit generator, are carried to the comparator circuit. If there is a discrepancy between the intermittent state of the bistable circuit and the state of the PCM signal received during the occurrence of the ninth digit the output gate of the comparator circuit 184 is permitted to pass an error digit. This error digit signal is carried thru an intergrator circuit 185 which is essentially a simple counter which sums the error pulses. The summed error pulse signal is carried from the intergrator to a threshold detector 186 which is set to a predetermined count which when exceeded by its input signal causes the threshold detector to issue a shift pulse signal. This shift pulse is carried to the digit generator 182 and causes the digit generator to shift a single digit. This shift occurs once for each frame until the system is reframed, i.e., until the error pulses disappear.

The unipolar PCM signal from the converter 180 is also carried to a conventional shift register 187 which includes a set of bistable circuits, arranged in series, to register in parallel form the eight digits making up each channel transmitted. The first digit of the PCM signal received enters the first bistable circuit of the shift register and sets it. This circuit, in turn, sets the next bistable circuit as the register is shifted. This continues until the register is filled with the digits of a complete channel and then it is cleared. The digit signals from the digit generator 182 pass through an OR gate 188 and are applied to the shift register 187 to shift this register on the occurrence of each digit. To clear the register a set of eight AND gates 191 through 198 are provided each one taking a first input from the respective bistable circuits of the shift register. A D1 signal corresponding to the occurrence of the last digit of each channel transmitted is taken from the digit generator 182 and passes through a delay circuit 199 where the D1 signal is delayed for a narrow increment of time long enough for the transmitted D1 digit to be properly registered in the shift register. The delayed D1 signal is carried from the delay circuit 199 to the shift register where it instructs the register to clear on the occurrence of the D1 delayed signal. This D1 signal is also applied as the second input of each of the gates 191 – 198 so that at the completion of each channel these gates pass the eight digits making up that channel to a digit storage circuit 200. The digit storage circuit holds the states of each of the eight digits until changed by subsequent received digits. The outputs of the digit storage 200 are a parallel group on a set of eight digit busses. Thus, at any point in time a particular transmitted channel is in the process of being entered in the shift register and the prior received channel is in the digit storage being released as a parallel group. The parallel output signals from the digit storage 200 are placed on eight digit busses which are wired to each of the channel stations of the apparatus.

Two channel stations are shown for providing binary data outputs, channel 1, and channel 24. Occupying the channel 1 station is a removable data channel output circuit 205 which includes provision for providing telegraph signal outputs. This data channel output circuit includes a set of seven AND gates 211 through 217 having their first inputs respectively connected to the digit busses of digits 2 through 8. Since digit 1 was transmitted as a biased pulse it carries no telegraph information. Thus a receiving gate is not required for this digit. The second inputs of the gates 211 – 217 are connected with the channel counter 183 to receive the channel 1 pulse. When channel 1 occurs the digits of that channel present on the digit busses are concurrently passed by the gates 211 – 217 to a set of switching circuits 221 through 227 respectively. The switching circuits include provisions for holding the state of a received digit until channel 1 recurres in the next frame. At that time if a new state of any digit is received the appropriate switching circuit will change its output. Thus, the switching circuits perform an intergration function by holding the states of the sampled digits transmitted until the next samples are received. Also, these switching circuits are connected to an appropriate power source, not shown, to provide the standard binary telegraph output of plus and minus 12 volts acting through an output impedence of 600 ohms which has been schematically illustrated as a 600 ohm resistance. The parallel telegraph output signals can thus be utilized in any manner as would be ordinary telegraph signals such as, for example, as inputs to a teleprinter.

A second data channel output circuit 230, for providing telegraph outputs, is shown occupying channel 24. This data channel output circuit is identical to the circuit 205 and thus includes a set of seven AND gates 231 – 237 which are connected to the respective digit busses and to the 24th channel terminal of the channel counter 183 so that these gates pass the received digits of channel 24. A set of seven output switching circuits 241 through 247 provide seven telegraph output signals from the digits of channel 24 as discussed above in reference to the channel 1 outputs.

Referring now to FIG. **5*b* illustrating the voice receiving equipment which is essentially as described in the aforementioned article appearing in the Bell System Technical Journal. A decoder 250, is provided, which is connected to the digit busses of digits 2 through 8. The decoder 250 decodes the digits of the successively received channels to provide a serial pulse code modulated signal in which the amplitude of each pulse corresponds to the amplitude of a voice-channel sample transmitted in PCM coded form. This serial PAM signal is carried to an expander 251 which perform the opposite function of the compressor of the transmitter, so that the voice samples are restored to their original condition. The output of the expander is carried to amplifier 252 to amplify this signal to a desirable working level. The PAM signal, from the amplifier 252, is carried to a voice signal buss 253** which is connected to all of the channel stations in the apparatus.

A voice channel output circuit 255, is shown, occupying channel station No. 2 of the apparatus. This circuit includes a voice gate 256, a low pass filter 257, and an amplifier 258. The voice gate is connected to the voice buss 253 and to the channel counter 183 of FIG. **5*a* to receive the channel No. 2 signal. The voice gate 256 is adapted to pass the pulse present on the voice buss when channel 2 occurs. This pulse passes through the low pass filter which performs an intergration function and essentially holds the pulse until channel 2 recurs in the next frame. The low pass filter output passes to the amplifier 258 where the channel 2 voice signal is amplified to a useable level. A second voice channel input circuit 260 is shown occupying channel station No. 23. It is identical to the voice channel output circuit 255 and thus includes a voice gate 261 for passing the voice pulses corresponding to channel 23, a low pass filter 262, and an amplifier 263, for providing an output voice signal for channel 23**.

Similar to the transmitter discussed above the channel stations of the receiving apparatus include all the wiring provisions necessary so that each station can interchangeably accept either a data output circuit or a voice output circuit. Also, it is contemplated that when substitutions of one type of input circuit are made for the other in the transmitting apparatus, a similar substitution is required in the receiving apparatus communicating therewith. This insures that voice channels are received as voice channels and likewise for the data channels. Also, it is preferred that the transmitting and receiving apparatus discussed above be joined together in a single piece of terminal equipment. In this way the data carrying input and output circuits can be joined together into a single removable data channel circuit which when substituted for a similarly grouped input and output voice channel circuit results in a concurrent adjustment both of the transmitting and receiving sides of the terminal. A similar substitution is then made of a second terminal in communication with the first.

It can be understood by those skilled in the art that the arrangement of the apparatus disclosed herein lends itself to great flexibility wherein various channel circuit can be substituted for those described. Thus, for example, a data channel circuit incorporating further time division multiplexing can be substituted for the data circuit described above. The only requirement of such a substituted circuit would be its compatibility with the transmission format and that it include the appropriate wiring connections so that it is interchangeable with the presently described removable circuit to occupy at least one of the channels of transmission.

While the invention has been described with a certain degree of particularity it can nevertheless be seen, by the examples hereinabove set forth, that many modifications and variations of the invention can be made without departing from the spirit and scope thereof.

I claim:

1. A time divison multiplex transmission apparatus for concurrently transmitting at least one voice signal and a plurality of binary data signals over a transmission medium, comprising:

a. timing and digit generating means for generating a series of timed digit signals arranged in a repetitive time formate suitable for time division multiplex transmission wherein said format includes a plurality of channels serially arranged each having a sufficient number of serially arranged transmission time slots of one binary digit each to intelligibly transmit a voice signal;

b. means for periodically sampling said voice signal at a sampling rate sufficiently high to enable intelligible reconstruction of said voice signal and for providing a pulse amplitude modulated first signal corresponding to the periodic voice samples;

c. encoding means, responsive to said timing and digit generating means (a), and operatively coupled with said sampling means (b), for encoding said pulse amplitude modulated first signal to provide a pulse code modulated second signal suitable for transmission over a first channel of said time format;

d. means for periodically sampling said data signals and for serially arranging the samples by sampling said signals in response to said timing and digit generating means (a) with a sufficient number of said transmission time slots of at least a second channel of said format at a sampling rate sufficiently high to provide a plurality of samples thereof over the time interval occupied by each digit of said data signals and for providing a third signal corresponding to said serially arranged samples;

e. output means, for transmitting said serially arranged third signal and said pulse code modulated second signal over said transmission medium; and f. switching means, operatively connected with said sampling means (d) and with said encoding means (c) and being responsive to said timing and digit generating means (a), for switching said output means (e) to transmit said third signal during the occurrence of said at least second channel and for switching said output means (e) to transmit said pulse code modulated second signal during the occurrence of said first channel.

2. An adjustable time division multiplex transmission apparatus for transmitting over a transmission medium a variable number of separate voice and binary data signals from respective sources thereof, comprising:

a. timing and digit generating means for generating a series of timed digit signals arranged in a repetitive time format suitable for pulse code modulation transmission wherein said format includes a plurality of channels serially arranged each having a sufficient number of serially arranged transmission time slots of one binary digit each to intelligibly transmit a voice signal;

b. voice sampling and encoding means for sequentially sampling each of said voice signals at a sampling rate sufficiently high to enable intelligible reconstruction of said voice signals and for digitally encoding said sampled voice signals in response to said timing and digit generating means to form a serial pulse code modulated first signal in accordance with said format wherein said voice signals are allocated separately one to a channel of said channels for transmission;

c. means, responsive to said timing and digit generating means (a) for sampling said data signals with a sufficient number of said transmission time slots of another channel of said format to provide a plurality of samples of each of said data signals over the time interval occupied by each respective digit thereof and for providing a second signal corresponding to said samples serially arranged;

d. removable voice input circuit means for receiving into said apparatus for transmission at least one input voice signal from said source thereof, said input circuit means being removable connected in said transmission apparatus;

e. removable data input circuit means for receiving into said apparatus for transmission a plurality of said data signals from said source thereof, said data input circuit means being removably connected in said transmission apparatus;

f. output means for transmitting said pulse code modulated first signal and said serially arranged second signal in said channels over said transmission medium; and g. switching means, operatively connected with said voice sampling and encoding means (b) and with said sampling means (c), responsive to said timing and digit generating means (a) and responsive to the type of input circuit means (d) and (e) present in the apparatus, for switching said output means (f) to transmit said first signal during the occurrence of said channels for transmission of said voice signals and for switching said output means (f) to transmit said second signal during the occurrence of said other channel for transmission of said data signals.

3. The apparatus of claim 2 wherein said timing and digit generating means (a) are adapted to provide a plurality of time slots sufficient in number to intelligibly transmit a voice signal in each of said plurality of channels, wherein said removable data input circuit means (e) includes means for receiving into said apparatus for transmission a plurality of said data signals at least sufficient in number to occupy all of the time slots of one of said channels, wherein said removable voice input circuit means (d) includes means for receiving into said apparatus for transmission one input voice signal for occupying the time slots of one of said channels, and wherein said apparatus further comprises channel input connection means for interchangeably accepting said removable data input circuit means and said removable voice input circuit means.

4. An adjustable time division multiplex transmission apparatus for transmitting over a transmission medium a variable number of separate voice and binary data signals from respective sources thereof, comprising:

a. timing and digit generating means including a channel counter for generating a series of timed digit signals arranged in a repetitive time format suitable for time division multiplex transmission wherein said format includes a plurality of channels occurring successively each have a sufficient number of serially arranged transmission time slots of one binary digit each to intelligibly transmit a voice signal;

b. voice sampling and encoding means for sequentially sampling each of said voice signal at a sampling rate sufficiently high to enable intelligible reconstruction of said voice signals and for digitally encoding said sampled voice signals in response to said timing and digit generating means to form a serial pulse code modulated first signal in accordance with said format wherein each of said voice signals singularly occupies one of said channels for transmission;

c. at least one removable voice channel input circuit operatively connected with said voice sampling and encoding means (b) for receiving into said apparatus for transmission one of said voice signals from said source thereof, said voice channel input circuit being removably connected in said transmission apparatus;

d. at least one data channel input circuit for receiving into said apparatus for transmission a plurality of said binary data signals to occupy transmission time slots in at least one of said channels, said data channel input circuit including gating means operatively connected with said timing and digit generating means (a) for serially gating said plurality of data signals in synchronism with the respective occurrence of the transmission time slots of at least one of said channels to provide a serially arranged data channel second signal suitable for transmission in at least one channel of said format, said data channel input circuit being removably connected in said apparatus;

e. means including preselected channel connection means, coupled with said sampling and encoding means (b) and with said timing and digit generating means (a), for interchangeably accepting said voice channel input circuit (c) and said data channel input circuit (d) to interchangeably occupy with said voice signal and said data signals at least one preselected channel of said channels for transmission, whereby the data transmitting capacity of said apparatus can be increased by removing said voice channel input circuit (c) and replacing it by a data channel input circuit (d) and the voice transmitting capacity of said apparatus can be increased by removing said data channel input circuit (d) and replacing it by a voice channel input circuit (c);

f. output means for transmitting said pulse code modulated first signal and said serially arranged data channel second signal in the form of an output signal over said transmission medium; and g. switching means, connected with said voice sampling and encoding means (b), with said input channel connection means (e), and connected with said output means (f), for switching said output means to transmit said first signal during the occurrence of a preselected channel for which a voice channel input circuit is present in said apparatus and for switching said output means (f) to transmit said data second signal during the occurrence of a preselected channel for which a data channel input circuit is present in said apparatus.

5. An adjustable time division multiplex transmission apparatus for transmitting over a transmission medium a variable number of separate voice and binary data signals from respective sources thereof, comprising:

a. timing and digit generating means including a channel counter for generating a series of timed digit signals arranged in a repetitive time format suitable for time division multiplex transmission wherein said format includes a plurality of channels occurring successively each having a sufficient number of serially arranged transmission time slots of one binary digit each to intelligebly transmit a voice signal;

b. at least one removable voice channel input circuit for receiving into said apparatus for transmission one of said voice signals from said source thereof, said voice channel input circuit being removably connected in said transmission apparatus;

c. at least one removable data channel input circuit for receiving into said apparatus for transmission a plurality of said binary data signals from said source thereof, said removable data channel input circuit including channel gating means responsive to said timing and digit generating means (a) for passing said plurality of data signals into said apparatus during the occurrence of at least one preselected channel of said format, said data channel input circuit being removably connected in said apparatus;

d. means including preselected channel connection means coupled with said timing and digit generating means (a) for interchangeably accepting said voice channel input circuit (b) and said data channel input circuit (c) to interchangeably occupy with said voice signal and said data signals thereof at least one preselected channel of said channels for transmission, whereby the data transmitting capacity of said apparatus can be increased by removing said voice channel input circuit (b) and replacing it by a data channel input circuit (c) and the voice transmitting capacity of said apparatus can be increased by removing said data channel input circuit (c) and replacing it by a voice channel input circuit (b);

e. voice sampling and encoding means operatively coupled with said voice channel input circuit (b) through said connection means (d) for sampling said voice signal at a sampling rate sufficiently high to enable intelligible reconstruction thereof and for digitally encoding said sampled voice signal in response to said timing and digit generating means (a) to form a serial pulse code modulated first signal wherein said voice signal is allocated to said at least one preselected channel for transmission;

f. digit gating means connected with said timing and digit generating means (a) and operatively coupled with at least one removable data channel input circuit (c) through said connection means (d) for providing a serially gated data second signal suitable for transmission in said at least one preselected channel by serially gating respectively said plurality of binary data signals passed during the occurrence of said at least one preselected channel in synchronism with the respective occurrence of the transmission time slots thereof, to occupy said time slots;

g. output means for transmitting said pulse code modulated first signal and said serially gated data channel second signal in the form of an output signal over said transmission medium; and h. switching means, connected with said voice sampling and encoding means (e), connected with said gating means (f), and connected with said output means (g) for switching said output means to transmit said first signal during the occurrence of a preselected channel for transmission of a voice signal for which a voice channel input circuit is present in said apparatus and for switching said output means (g) to transmit said data second signal of a preselected channel for transmission of data signals for which a data channel input circuit is present in said apparatus.

6. The apparatus of claim 4 wherein said switching means (g) comprises:

a. a bistable circuit;

b. signalling means coupled with said connection means (e) and said timing and digit generating means (a), for providing an indentifying signal to identify which of said input circuits (c) and (d) is present in said apparatus during the occurrence of said preselected channels;

c. gated driving means responsive to said signalling means (b) for driving said bistable circuit to a first state during the occurrence of a preselected channel for which a voice channel input circuit is present in said apparatus and for driving said bistable circuit to a second state during the occurrence of a preselected channel for which a data channel input circuit is present in said apparatus; and d. means including a pair of output control AND gates driven by said bistable circuit for passing to said output means (f) said pulse code modulated first signal when said bistable circuit is in a first state and for passing to said output means (f) said data second signal when said bistable circuit is in a second state.

7. The apparatus of claim 5 wherein said switching means (h) comprises:

a. a bistable circuit;

b. signalling means coupled with said connection means (d) and said timing and digit generating means (a) for providing an identifying signal to identify which of said input circuits (b) and (c) is present in said apparatus during the occurrence of said preselected channels;

c. gated driving means responsive to said signalling means (b) for driving said bistable circuit to a first state during the occurrence of a preselected channel for which a voice channel input circuit is present in said apparatus and for driving said bistable circuit to a second state during the occurrence of a preselected channel for which a data channel input circuit is present in said apparatus;

d. means including a pair of output control AND gates driven by said bistable circuit for passing to said output means (g) said pulse code modulated first signal when said bistable circuit is in a first state and for passing to said output means (g) said data second signal when the said bistable circuit is in a second state.

8. An adjustable time division multiplex communication apparatus for transmitting and receiving over a transmission medium a variable number of separate voice and binary data signals including the transmission apparatus of claim 4 and further comprising:

a. time division multiplex receiving means for receiving a transmitted signal from a second transmission apparatus as defined in claim 4 and reconstituting in parallel form the transmitted digits representing said time slots of said channels of said transmitted format, said receiving means including a clock extraction circuit, a receiving digit generator for extracting the timing inherent in said transmitted signal received, a receiving channel counter for reconstituting the channel count inherent in said transmitted signal received, framing means for synchronizing the reconstituted format with said format as transmitted, a shift register and digit storage for registering and releasing as a parallel group the digits of each said channels reconstituted;

b. voice decoding means operatively coupled with said digit storage for decoding said received channel digits and for providing a plurality of successive sample signals representing said decoded channels;

c. voice signal gating means and voice reconstituting means incorporated in said removable voice channel input circuit (c) of said communication apparatus corresponding to the preselected channel of said second transmission apparatus for which a removable voice channel input circuit is present in said transmission apparatus, said voice signal gating means being operatively coupled with said decoding means and responsive to said receiving channel counter for passing said decoded samples signal during the occurrence of said preselected channel for transmission of said voice signal and for reconstituting said voice signal from said passed samples; and d. means including a plurality of output gates incorporated in said removable data channel input circuit (d) of said communication apparatus corresponding to the preselected channel of said second transmission apparatus for which a removable data channel input circuit is present in said transmission apparatus, said plurality of output gates being operatively coupled with said receiving data storage and responsive to said receiving channel counter for providing a plurality of parallel output binary data signals during the occurrence of said preselected channel for transmission of data signals.

9. An adjustable time division multiplex communication apparatus for transmitting and receiving over a transmission medium a variable number of separate voice and binary data signals including the transmission apparatus of claim 5 and further comprising:

a. time division multiplex receiving means for receiving a transmitted signal from a second transmission apparatus as defined in claim 5 and for reconstituting in parallel form the transmitted digits representing said time slots of said channels of said transmitted format, said receiving means including a clock extraction circuit, a receiving digit generator for extracting the timing inherent in said transmitted signal received, a receiving channel counter for reconstituting the channel count inherent in said transmitted signal received, framing means for synchronizing the reconstituted format with said format as transmitted, a shift register and digit storage for registering and releasing as a parallel group the digits of each said channels reconstituted;

b. voice decoding means operatively coupled with said digit storage for decoding said received channel digits and for providing a plurality of successive sample signals representing said decoded channels;

c. voice signal gating means and voice reconstituting means incorporated in said removable voice channel input circuit (b) of said communication apparatus corresponding to the preselected channel of said second transmission apparatus for which a removable voice channel input circuit is present in said transmission apparatus, said voice signal gating means being operatively coupled with said decoding means and responsive to said receiving channel counter for passing said decoded samples signal during the occurrence of said preselected channel for transmission of said voice signal and for reconstituting said voice signal from said passed samples; and d. means including a plurality of output gates incorporated in said removable data chennel inpur circuit (c) of said communication apparatus corresponding to the preselected channel of said second transmission apparatus for which a removable data chennel input circuit is present in said transmission apparatus, said plurality of output gates being operatively coupled with said receiving data storage and responsive to said receiving channel counter for providing a plurality of parallel output binary data signals during the occurrence of said reselected channel for transmission of data signals.

10. A method for transmitting a plurality of serial binary data streams over a voice allocable channel of a time division multiplex transmission system, comprising the steps of:

a. generating a successively repeated transmission format for binary digital time division multiplex transmission comprised of a plurality of serially arranged transmission channels each having a plurality of serially arranged consecutively occurring transmission digits sufficient in number to intelligibly transmit a voice signal;

b. allocating respectively at least one of said transmission digits of one said channel to carry each of said respective data streams;

c. sampling each of said respective data streams by the successive occurrence of the respective transmission digits allocated thereto at a sampling rate sufficiently high to provide a plurality of samples of each stream over the time interval occupied by each respective data digit thereof;

d. serially arranging the samples of said streams for transmission over said channel on the occurrence of said channel; and e. transmitting said samples of said binary data streams by transmitting said channel as part of said transmission format over a transmission medium.

11. The method of claim 10 wherein said channel of said transmission format is generated to include at least seven transmission digits and wherein said step (b) is performed in a manner allocating no more than one of said transmission digits for each data stream, whereby said channel is capable of carrying seven of said data streams.

12. The method of claim 11 wherein said data streams are serially arranged binary telegraph signals and wherein said sampling step (c) is performed at a rate sufficiently high to provide at least eight samples of each respective telegraph signal over said data digit time interval.

* * * * *